US 008847903B2

(12) United States Patent
Stokes et al.

(10) Patent No.: US 8,847,903 B2
(45) Date of Patent: Sep. 30, 2014

(54) UNLOCKING AN ELECTRONIC DEVICE

(75) Inventors: Mark S Stokes, Streamwood, IL (US);
Jason G Maxham, Forest Park, IL (US);
Catherine T Nguyen, Mountain View, CA (US); Enrique Sanchez, Franklin Park, IL (US); Denis B Stolyarov, Northbrook, IL (US)

(73) Assignee: Motorola Mobility LLC, Libertyville, IL (US)

( * ) Notice: Subject to any disclaimer, the term of this patent is extended or adjusted under 35 U.S.C. 154(b) by 259 days.

(21) Appl. No.: 13/457,283

(22) Filed: Apr. 26, 2012

(65) Prior Publication Data

US 2013/0285925 A1 Oct. 31, 2013

(51) Int. Cl.
*G06F 3/041* (2006.01)

(52) U.S. Cl.
USPC .......................................... 345/173; 345/156

(58) Field of Classification Search
CPC ........ G06F 3/041; G06F 3/048; H04M 1/655; H04M 1/66
USPC .................. 345/173, 156; 455/411; 715/863; 713/183
See application file for complete search history.

(56) References Cited

U.S. PATENT DOCUMENTS

| | | | |
|---|---|---|---|
| 7,657,849 B2 | 2/2010 | Chaudhri | |
| 8,046,721 B2 | 10/2011 | Chaudhri | |
| 8,095,879 B2 | 1/2012 | Goertz | |
| 8,127,254 B2 | 2/2012 | Lindberg et al. | |
| 8,136,053 B1 | 3/2012 | Miller et al. | |
| 8,355,698 B2 * | 1/2013 | Teng et al. | 455/411 |
| 8,504,842 B1 * | 8/2013 | Meacham | 713/183 |
| 8,538,403 B2 * | 9/2013 | Singh et al. | 455/418 |
| 8,539,382 B2 * | 9/2013 | Lyon et al. | 715/863 |
| 8,571,521 B2 * | 10/2013 | Kim et al. | 455/411 |
| 8,638,385 B2 * | 1/2014 | Bhogal | 348/333.02 |
| 2011/0279384 A1 | 11/2011 | Miller | |
| 2012/0084651 A1 | 4/2012 | Miller et al. | |
| 2012/0174042 A1 | 7/2012 | Chang | |

FOREIGN PATENT DOCUMENTS

GB 2486707 A 6/2012

OTHER PUBLICATIONS

Image of Google Android "Ice Cream Sandwich" version Unlock Screen captured Sep. 1, 2011.
Catherine T. Nguyen, et al., "Initiation of Actions by a Portable Computing Device from a Locked State", U.S. Appl. No. 13/366,369, filed Feb. 6, 2012, 39 pages.
Microsoft, Inc., "Customize your Start Menu", Windows XP: Computer Setup and Maintenance, http://www.microsoft.com/windowsxp/using/setup/personalize/startmenu.mspx?pf=true, Sep. 7, 2006, 11 pages.
Mitchell Bartlett, "Motorola Droid: Set Screen Unlock Pattern", Technipages, http://www.technipages.com/motorola-droid-set-screen-unlock-pattern.html, Mar. 21, 2012, 5 pages.
Conduit, "Quick Launch—Lock Screen" on Google Play, https://play.google.com/store/apps/details?id=com.conduit.locker&hl=en, accessed Dec. 21, 2012, 2 pages.

* cited by examiner

*Primary Examiner* — Ricardo L Osorio
(74) *Attorney, Agent, or Firm* — Shumaker & Sieffert, P.A.

(57) ABSTRACT

A method and apparatus for unlocking an electronic device includes displaying (110) a lockscreen with an initial image in an initial region on a touch screen of the electronic device when it is in a locked state (100). Responsive to detecting (120) a first touch contact in the initial region, the electronic device displays (130) an intermediate image in a secondary region of the touch screen. Responsive to detecting (140) a second touch contact in the secondary region, the electronic device displays (150) an action image in a tertiary region of the touch screen. Responsive to detecting (160) a third touch contact in the tertiary region, the electronic device executes (180) an action associated with the action image and transitions the electronic device to an unlocked state (190).

23 Claims, 10 Drawing Sheets

UNLOCKING AN ELECTRONIC DEVICE

FIELD OF THE DISCLOSURE

The present disclosure relates generally to accessing software functions of an electronic device using a touch-sensitive display and more particularly to unlocking electronic devices using a touch-sensitive display.

BACKGROUND

Touch-sensitive displays, or "touch screens," are increasingly used by many electronic devices, particularly portable computing devices. Touch-sensitive displays are commonly used to display graphics, text, and/or video and also to allow user interaction with an electronic device. A touch-sensitive display detects and responds to contact with a region of the display. For example, a touch-sensitive display may be used to display one or more soft keys, menus, or other items in different regions, and a user contacts the touch-sensitive display at a specific region to interact with a particular soft key, menu, or other item.

Unintentional contact with regions of a touch-sensitive display, however, may result in unintentional activation or deactivation of applications or device functionality. To avoid unintentional activation or deactivation due to unintentional contact with a touch-sensitive display, one or more lock conditions may be used to place the electronic device and/or one or more applications executed by the electronic device in a locked state. While in a locked state, contact with the touch-sensitive display may only initiate certain functions such as the unlock function and, optionally, the ability to answer (or silence) an incoming call.

Conventionally, a touch-sensitive display transitions from a locked state to an unlocked state by the user touching a set of regions of the touch-sensitive display in a defined pattern or by contacting the touch-sensitive display along a predetermined path. There is an opportunity develop additional unlocking mechanisms for an electronic device having a touch-sensitive display.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 2-3 and 7-9 illustrate an example of a user interface sequence for transitioning an electronic device from a locked state to a video camera application and an unlocked state in accordance with some embodiments.

FIGS. 10-12 and 15-16 illustrate an example of a user interface sequence for transitioning an electronic device from a locked state to a telephony application and an unlocked state where a current call is placed on hold and an incoming call is answered in accordance with some embodiments.

Figure 1:
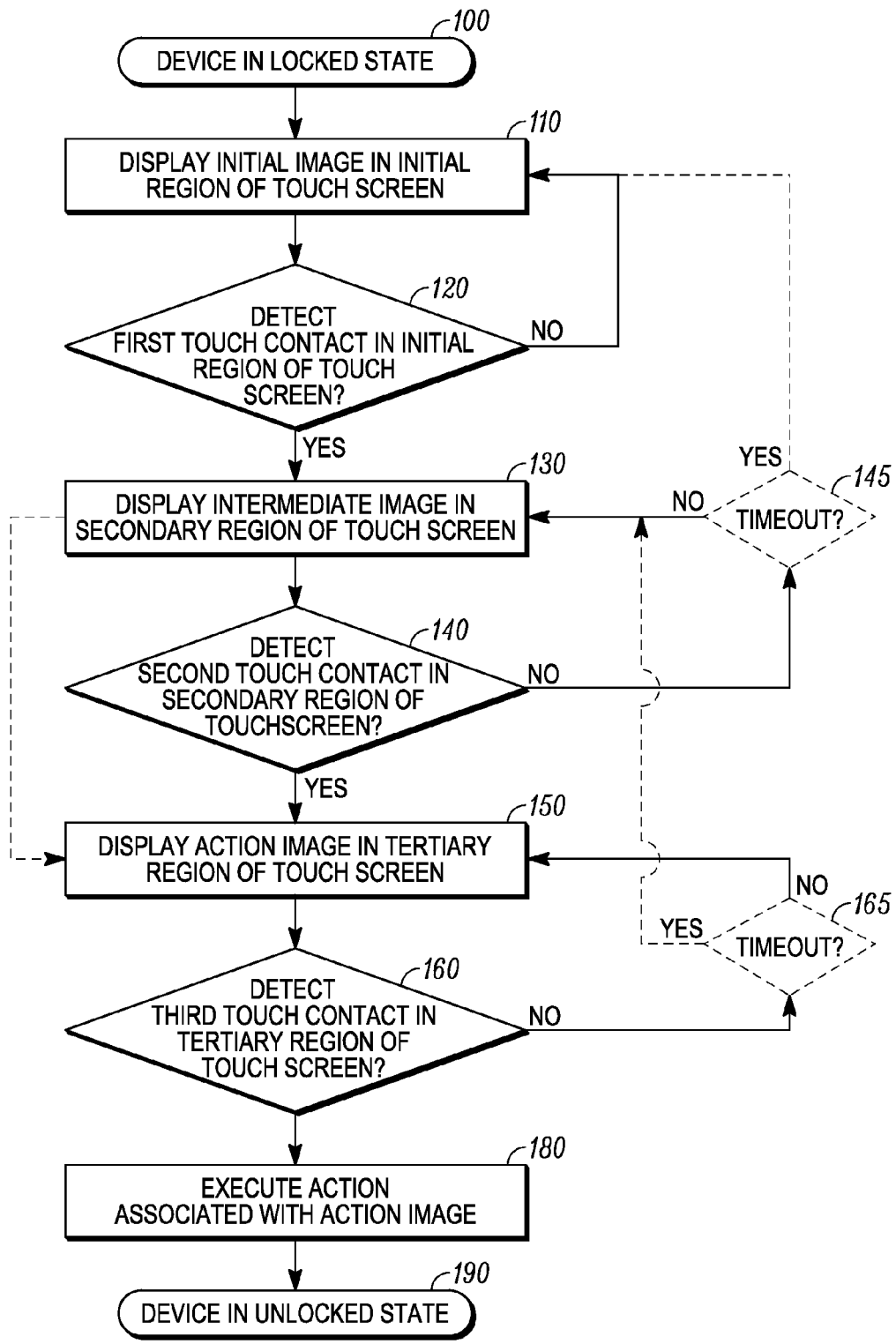
FIG. 1 shows a flow chart of a method for unlocking an electronic device responsive to receiving inputs via a touch-sensitive display in accordance with some embodiments.

Skilled artisans will appreciate that elements in the drawings are illustrated for simplicity and clarity and have not necessarily been drawn to scale. For example, the dimensions of some of the elements in the drawings may be exaggerated relative to other elements to help to improve understanding of embodiments of the present invention. The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

The following describes a method and apparatus for transitioning an electronic device with a touch screen from a locked state to an unlocked state. The transition includes a selection of an initial image in an initial region of a touch screen, a selection of an intermediate image in a secondary region of the touch screen, and a selection of an action image in a tertiary region of the touch screen. When the action image is selected, the electronic device executes the indicated action and moves to an unlock state. Contacting the initial region of a touch screen selects the initial image, which may be an unlock image. Contacting the secondary region of the touch screen selects the intermediate image, which may refer to a class of actions such as camera (e.g., still or video), messaging (e.g., text messaging or corporate sync messaging), telephony (e.g., holding a current call and answering an incoming call or ending a current call and answering an incoming call). In this manner, a multi-stage unlock gesture may be indicated to the user. This unlock gesture may be a slide gesture, multiple tap gestures, or a combination of slide and tap gestures. The multi-stage unlock gesture not only transitions the phone from a lock state to an unlock state, but it also may launch a particular software application as indicated by an action image.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

Methods

FIG. 1 shows a flow chart of a method for unlocking a touch screen of an electronic device responsive to receiving inputs via the touch-sensitive display in accordance with some embodiments. In some embodiments, the method includes different and/or additional steps compared to FIG. 1. Moreover, in some embodiments, certain steps in the method may be performed in a different order than illustrated by FIG. 1. Note that this flow chart only addresses one activation of an unlock sequence. A personal identification number (PIN) based unlock sequence (usually using a telephony keypad) may be implemented in addition to the unlock sequence described with reference to this flow chart.

An electronic device may be in a locked state 100 due to a variety of conditions as determined by the electronic device. For example, if the electronic device has been inactive or idle for a specified time interval, or has received an input instruction to lock the electronic device, the electronic device may enter a locked state 100. In the locked state, components of the electronic device receive power but the electronic device does not perform an action responsive to most inputs received via an input component and/or a physical sensor. Although not shown, the display may be powered down to conserve energy and powered up when a user intends to view with the display.

When the display is powered up, the electronic device may display text and/or images indicating the locked state. Data displayed on the touch screen while the electronic device is in a locked state may be called a "lockscreen." When the electronic device is in the locked state 100, the lockscreen may display 110 an initial image in an initial region of the touch screen. The initial region may be larger than, the same size as, or smaller than the initial image. Boundaries of the initial region may be displayed to a user or they may be graphically hidden from the user.

If no contact is detected in the initial region, while the touch screen is powered up, the electronic device continues to display 110 the initial image in the initial region of the touch screen. Although not shown, the touch screen may power down after a predetermined time period of inactivity, which saves energy.

When the touch screen is powered up, responsive to the electronic device detecting 120 a touch contact with the first region of the touch screen, in which the initial image is displayed, the electronic device displays 130 an intermediate image in a secondary region of the touch screen. The secondary region may be larger than, the same size as, or smaller than the intermediate image. Boundaries of the secondary region may be displayed to a user or they may be graphically hidden from the user.

The intermediate image may relate to a set of applications or functions available from the electronic device. For example, the intermediate image may relate to messaging in general. Note that more than one intermediate image may be displayed 130, each in its own secondary region. The secondary regions may be non-overlapping or overlapping with respect to another secondary region or an initial region. If a secondary region is not overlapping any other region, the location of a touch contact may be sufficient to determine when a touch contact occurs on that secondary region. If two or more regions are overlapping, the electronic device may use additional or alternate touch information, such as sequence, trajectory, and/or velocity, to determine a secondary region a user is intending to contact.

If no second touch contact is detected in a secondary region, the electronic device may continue displaying 130 the intermediate image in the secondary region of the touch screen. Optionally, if no second touch contact is detected on the secondary region for a timeout period 145, the electronic device may stop displaying the secondary image and revert to displaying 110 the initial image in the initial region of the touch screen.

Responsive to the electronic device detecting 140 a second touch contact in a secondary region of the touch screen, in which an intermediate image is displayed, the electronic device displays 150 an action image in a tertiary region of the touch screen. Note that more than one action image may be displayed 150, each in its own tertiary region. A tertiary region may be non-overlapping or overlapping with respect to another tertiary region, a secondary region, or an initial region. If a tertiary region is not overlapping any other region, the location of a touch contact may be sufficient to determine when a third touch contact occurs in that tertiary region. If two or more regions are overlapping, the electronic device may use additional or alternate touch information, such as sequence, trajectory, and/or velocity, to determine a tertiary region that a user is intending to contact.

The action image is associated with an action performed by the electronic device and is also associated with the intermediate image that was displayed in the contacted secondary region. In an embodiment, the action image includes a graphical representation of the action to be performed by the electronic device when the tertiary region is contacted. For example, the action image may be a particular messaging application such as text messaging. In other embodiments, the action image includes a text representation of the action to be performed by the electronic device when the tertiary region is contacted. For example, the action image may include the term "text".

Note that some embodiments may present both an intermediate image and an action image upon detection 120 of a first contact in an initial region of the touch screen. For example, upon detection 120 of a first contact, an electronic device may display both an intermediate image that relates to messaging in general and an action image that transitions the electronic device to an unlock state.

Responsive to the electronic device detecting 160 a third touch contact with a tertiary region of the touch screen, in which an action image is displayed, the electronic device executes 180 the action associated with the action image. For example, if a text messaging action image is contacted, the text messaging application is launched by the electronic device. At this point, the electronic device transitions to an unlocked state 190. While in the unlocked state 190, the electronic device performs actions and/or functions in response to an input component of the electronic device or to a physical sensor receiving an input.

If no third touch contact is detected on the tertiary region, the electronic device may continue displaying 150 the action image in the tertiary region of the touch screen. Optionally, if no third touch contact is detected on the tertiary region for a timeout period 165, the electronic device may stop displaying the tertiary image and revert to displaying 130 the intermediate image in the secondary region of the touch screen.

In an embodiment, the electronic device provides visual cues to guide a user to contact the touch screen in a manner that progresses the electronic device from the locked state to the unlocked state. For example, when the initial image is displayed 110 on the lockscreen, the electronic device may brighten, enlarge, pulsate, animate, or otherwise highlight the initial image to encourage user contact with the initial region. After the first contact is detected in the initial region, the initial image may be faded, reduced, or removed and the intermediate image may be brightened, enlarged, pulsated, animated, or otherwise highlighted to encourage user contact with the secondary region. Then, after the second contact is detected in the secondary region, both the initial image and the intermediate image may be faded, reduced, or removed and the action image may be brightened, enlarged, pulsated, animated, or otherwise highlighted to encourage user contact with the tertiary region. Other examples of highlighting an image include changing the color of an image, displaying the boundaries of the region associated with the image, and adding a sparkle icon or other visual effect to the image.

The first, second, and third touch contacts may be discrete taps, slide gestures, or a combination of tap and slide gestures. If the electronic device detects movement of the first touch contact, which makes the touch contact a slide gesture, it may determine a direction (or trajectory) of the slide gesture and gradually highlight the intermediate image that seems to be indicated by the direction of the slide gesture. If the slide gesture changes direction, the electronic device may fade the previously-highlighted intermediate image and highlight a different intermediate image that seems to be the target of the slide gesture. Similar visual cues may be implemented for the action images as well as the intermediate images.

The methods shown in FIG. 1 may be implemented in embodiments of hardware, software, or combinations of hardware and software. In an embodiment, instructions for performing the actions described below are stored in a storage component of the electronic device, and execution of the instructions by a processor performs the actions described above in conjunction with FIG. 1.

OPERATION EXAMPLE 1

Figure 2:
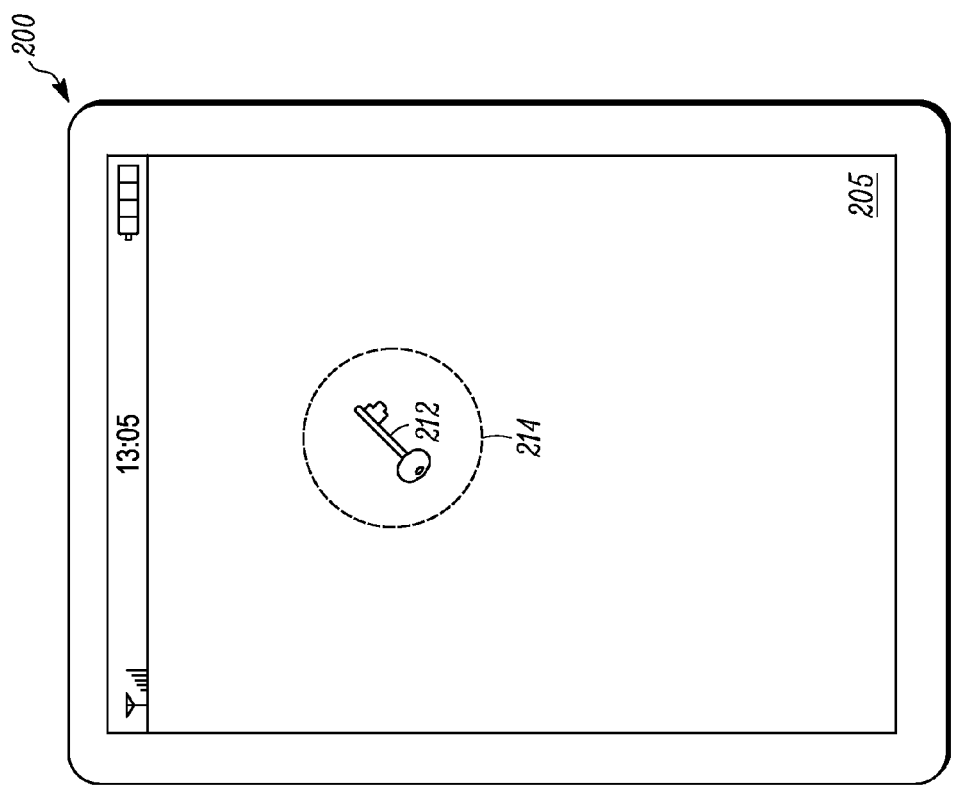

FIGS. 2-6 illustrate an example user interface sequence for transitioning an electronic device 200 from a locked state to a text messaging application and an unlocked state in accordance with some embodiments. In FIG. 2, the electronic device 200 is in a locked state and displays a lockscreen. An unlock image 212 is an initial image, and the electronic device displays this initial image in a initial region 214 of the touch screen 205. When the electronic device 200 is in this locked state, it does not respond to any touch screen inputs except for a contact within the initial region 214.

Figure 3:
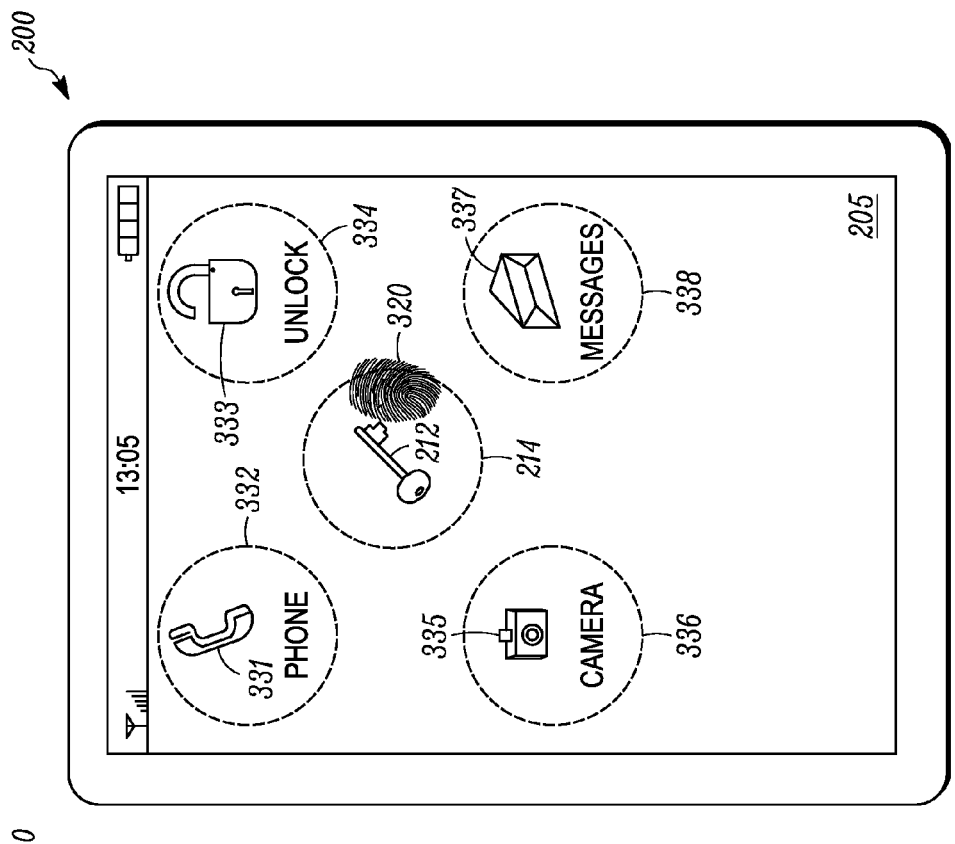
FIGS. 2-6 illustrate an example user interface sequence for transitioning an electronic device from a locked state to a text messaging application and an unlocked state in accordance with some embodiments.

In response to the electronic device detecting a first touch contact 320 with the touch screen 205 within the initial region 214, the display is modified to show an intermediate image 337 in a secondary region 338 as shown in FIG. 3. In the example of FIG. 3, the unlock initial image 212 remains displayed in the initial region 214 of the touch screen while two intermediate images 335, 337 are also displayed in individual secondary regions 336, 338 of the touch screen 205. Additionally, two action images 331, 333 are displayed in tertiary regions 332, 334 of the display. Note that, to visually aid the user in selecting either an intermediate image or an action image, the unlock image 212 may be faded, reduced, or darkened after the first touch contact 320 is detected.

FIG. 3 shows an intermediate image 337 that relates to messaging in general. FIG. 3 also shows an intermediate image 335 within another secondary region 336 that relates to a camera in general. In addition to the two intermediate images 335, 337, FIG. 3 also shows two action images 331, 333 that relate to a telephone dialer application and an unlock feature. When a user contacts tertiary region 332, the electronic device unlocks and launches a telephone dialer application. When a user contacts tertiary region 334, the electronic device simply unlocks without launching any application.

Figure 4:
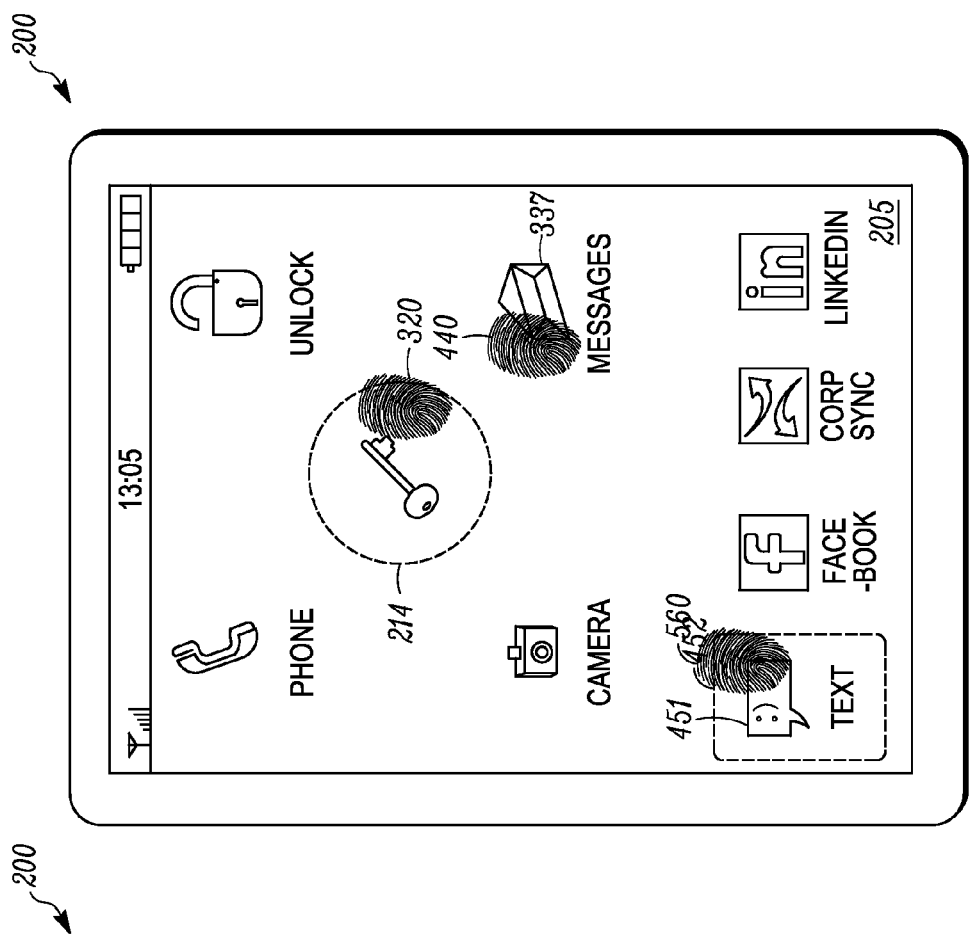

In response to the electronic device 200 detecting a second touch screen contact 440 within a secondary region 338, the display is further modified to show an action image 451 in a tertiary region 452 as shown in FIG. 4. FIG. 4 shows, in addition to the initial image of FIG. 2 and the intermediate and action images of FIG. 3, action images 451, 453, 455, 457 relating to the contacted intermediate image 337. For example, when the "messages" intermediate image 337 was touched, the electronic device 200 displayed a text messaging action image 451, a Facebook messaging action image 453, a corporate sync messaging action image 455, and a LinkedIn messaging action image 457. Each action image has its own tertiary region 452, 454, 456, 458 of the touch screen 205.

As mentioned previously, a tertiary region may overlap with other regions (such as initial region 214, secondary and tertiary regions 332, 334, 336, 338, or other tertiary regions). For example, the tertiary regions 452, 454 associated with the text messaging action image 451 and the Facebook messaging action image 453 overlap with the secondary region 336 associated with the camera intermediate image 335. Due to the sequence of events, however, after a detected second contact 440 in a secondary region, a touch in any location that is an intersection of a secondary region and a tertiary region will be interpreted to be a touch on the tertiary region. Thus, in situations where there are overlapping initial, secondary, and/or tertiary regions, the sequence help to selects the type of region that becomes available after the most recently-detected touch contact.

Figure 5:
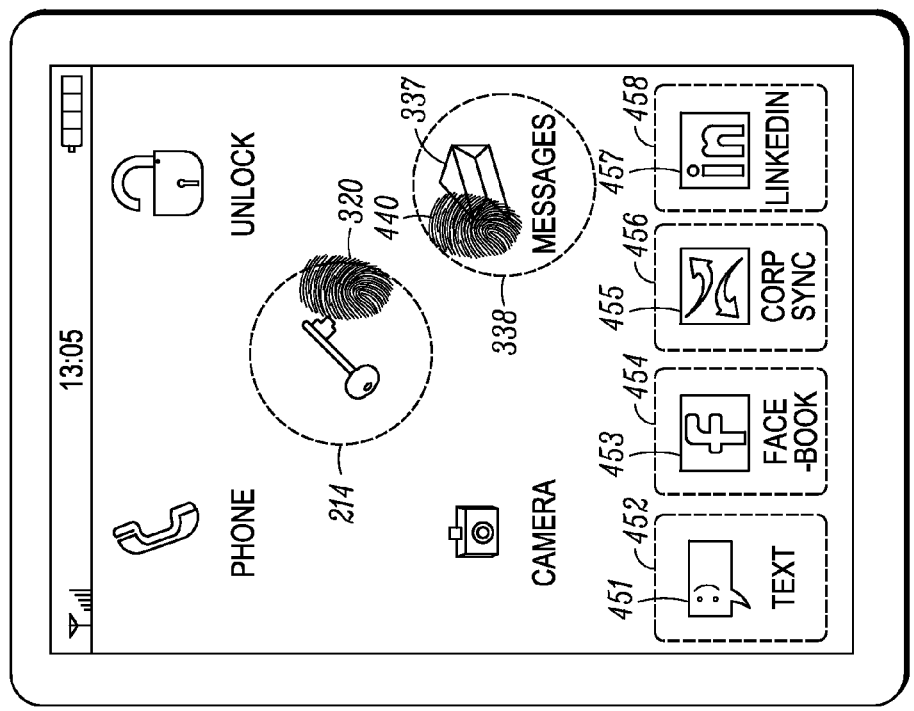
Figure 6:
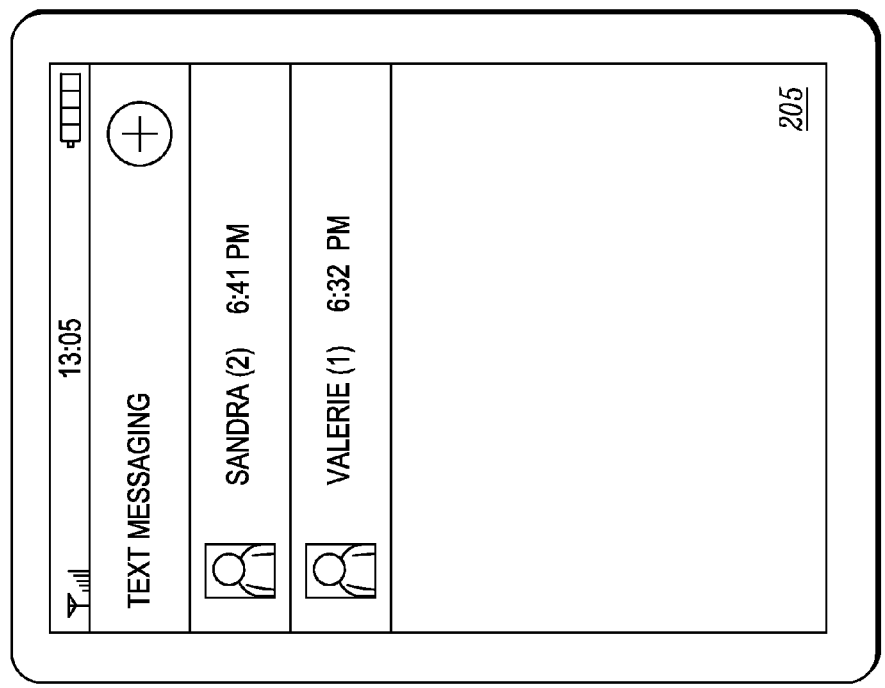

When a third touch 560 is detected in the tertiary region 452, the electronic device executes the action associated with the action image 451. In FIG. 5, the third touch 560 is within the tertiary region associated with the text messaging action image 451. Consequently, FIG. 6 shows the electronic device 200 launching the text messaging application. At this point, the electronic device is unlocked and the user may interact fully with the electronic device using the touch screen.

In the user interface sequence of FIGS. 2-6, the three touch contacts were all single tap gestures. In other embodiments, the three touch contacts may be part of a single multi-stage slide gesture as will be shown in FIGS. 2-3 and 7-9.

OPERATION EXAMPLE 2

FIGS. 2-3 and 7-9 illustrate an example user interface sequence for transitioning an electronic device 200 from a locked state to a video camera application and an unlocked state in accordance with some embodiments. FIGS. 2-3 have been previously described with reference to Operation Example 1.

Figure 7:
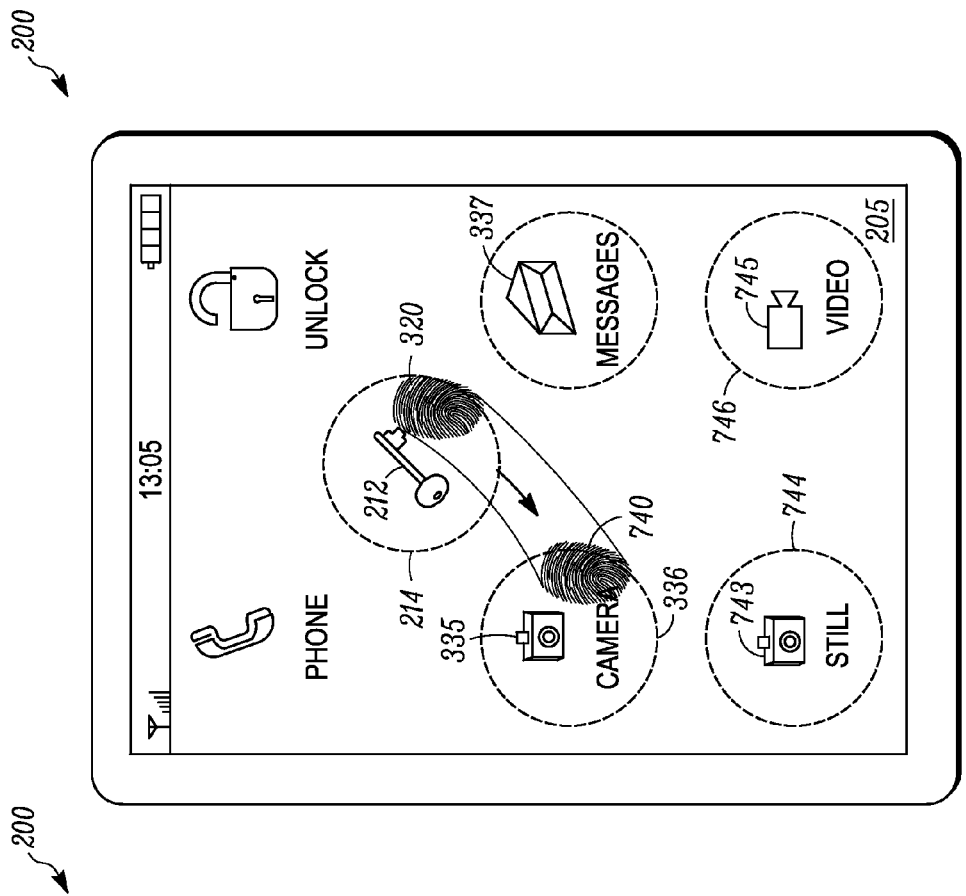

FIG. 7 illustrates a slide gesture from the first touch contact 320 to a second touch contact 740 within a secondary region 336 with a camera intermediate image 335. Due to the nature of a slide gesture, the electronic device may determine a trajectory of the slide gesture and highlight the intermediate or action image that is projected to be the target of the slide gesture. For example, as the slide gesture starts toward the camera intermediate image 335, the unlock initial image 212 may start to fade and the camera intermediate image 335 may start to brighten in color. As the slide gesture gets very close to the camera intermediate image 335, the camera intermediate image 335 may be fully highlighted using color, brightness, animation, and/or other techniques. If the slide gesture backed away from the camera intermediate image 335 to returned toward the unlock initial image 212, the intermediate image 335 may darken.

When the second touch contact 740 is detected within the secondary region 336 of the intermediate image, action images 743, 745 associated with the selected intermediate image appear in their respective tertiary regions 744, 746 of the touch screen 205. For example, the secondary region 336 is associated with a general camera intermediate image 335, and FIG. 7 shows a still camera action image 743 within a tertiary region 744 and a video camera action image 745 within another tertiary region 746. In this embodiment, the initial image 212 and the intermediate images 335, 337 as well as the previously-shown action images 331, 333 remain on the display but are darkened relative to the new action images 743, 745.

Similar to the description of FIG. 7, a swipe gesture may continue from the second touch contact 740 to the third touch contact 860. Due to the nature of a slide gesture, the electronic device 200 may determine a trajectory of the second part of the slide gesture and highlight the action image that is projected to be the target of the slide gesture continuation. For example, as the second part of the slide gesture starts toward both the still camera action image 743 and the video camera action image 745, both action images may brighten. But as the slide gesture continuation passes the still camera action image 743, the still camera action image 743 may start to fade and the video camera action image 745 may continue to brighten until the third contact is detected within the tertiary region 746 associated with the video camera action image 745.

Figure 9:
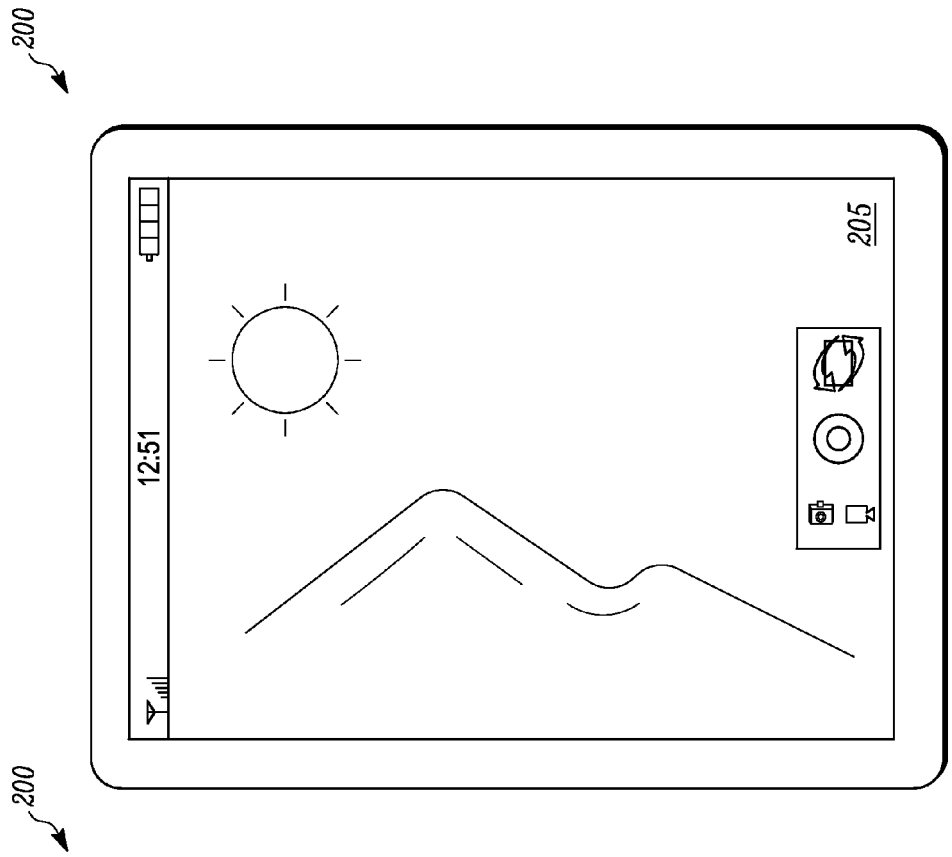
Figure 8:
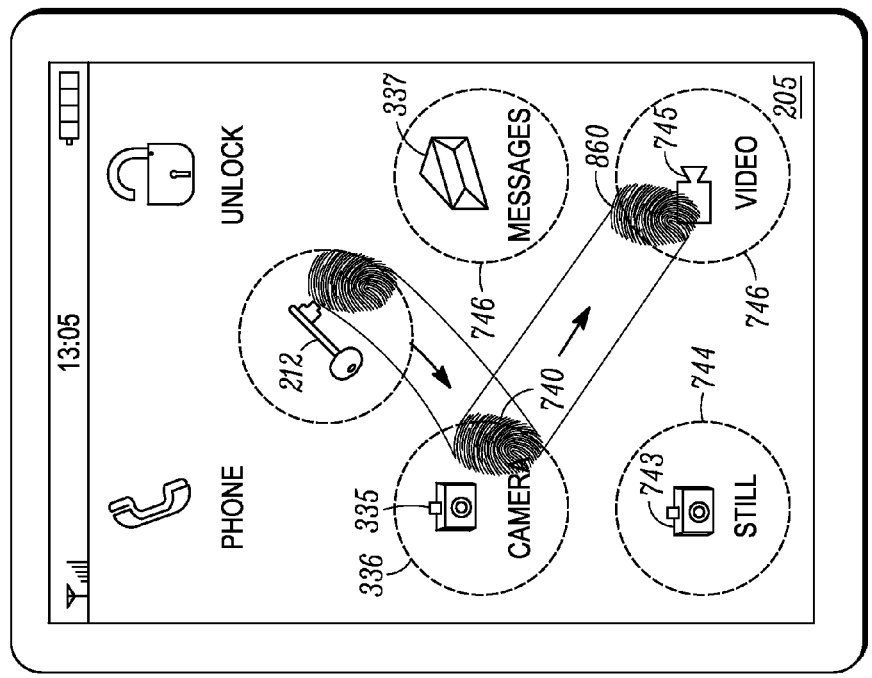

In response to the electronic device 200 detecting a third touch screen contact 860 within a tertiary region 746 as shown in FIG. 8, the electronic device 200 executes an action associated with the action image 745 of the tertiary region 746. FIG. 9 shows the electronic device launching the video camera application. At this point, the electronic device 200 is unlocked.

Both Operation Example 1 and Operation Example 2 start from a standard lockscreen that indicates that the device is in a locked state. Other lockscreens may also be available, which indicate when an incoming call is being received.

OPERATION EXAMPLE 3

FIGS. 10-14 illustrate an example user interface sequence for transitioning an electronic device from a locked state to a telephony application and an unlocked state where a current call is ended and an incoming call is answered in accordance with some embodiments.

Figure 10:
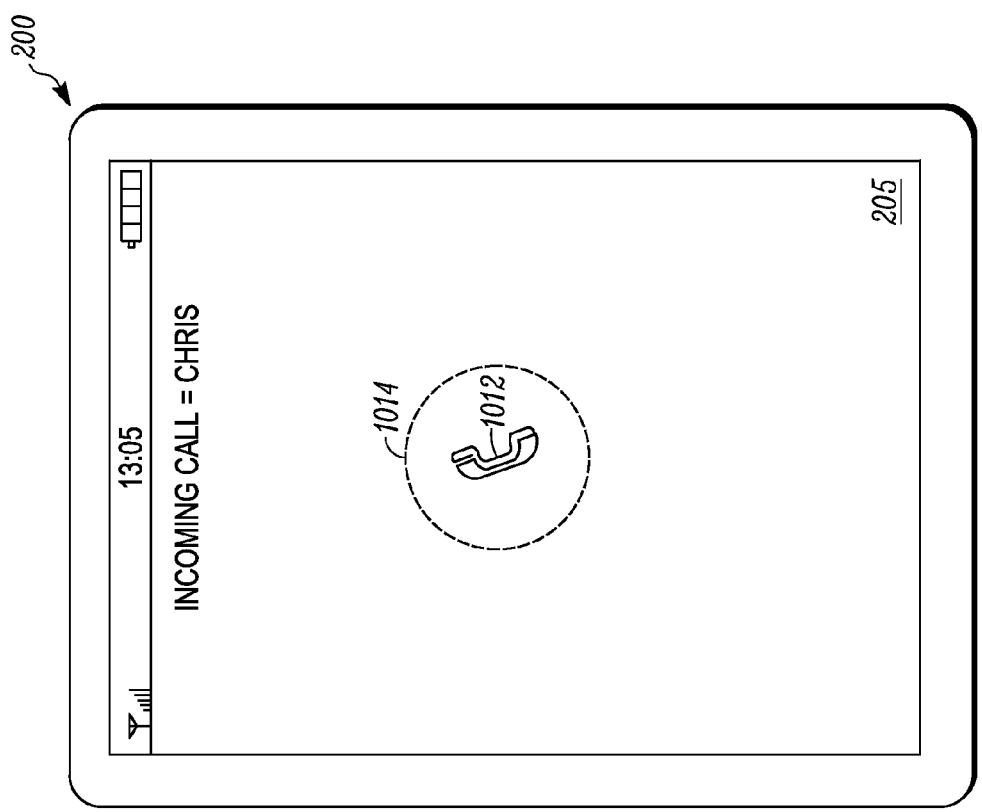

In FIG. 10, the electronic device 200 is in a locked state and an incoming call from "Chris" is being received. The electronic device displays the incoming call information and also provides an incoming call initial image 1012 in an initial region 1014 of the touch screen. Thus, this lockscreen is particular to the electronic device receiving an incoming call while in a locked state. As mentioned previously, the initial region may be smaller, the same size as, or larger than the initial image. In response to detecting a first contact 1120 with the touch screen 205 within the initial region 1014, the electronic device 200 modifies the display to show an intermediate image 1135 in a secondary region 1136 as shown in FIG. 11.

Figure 11:
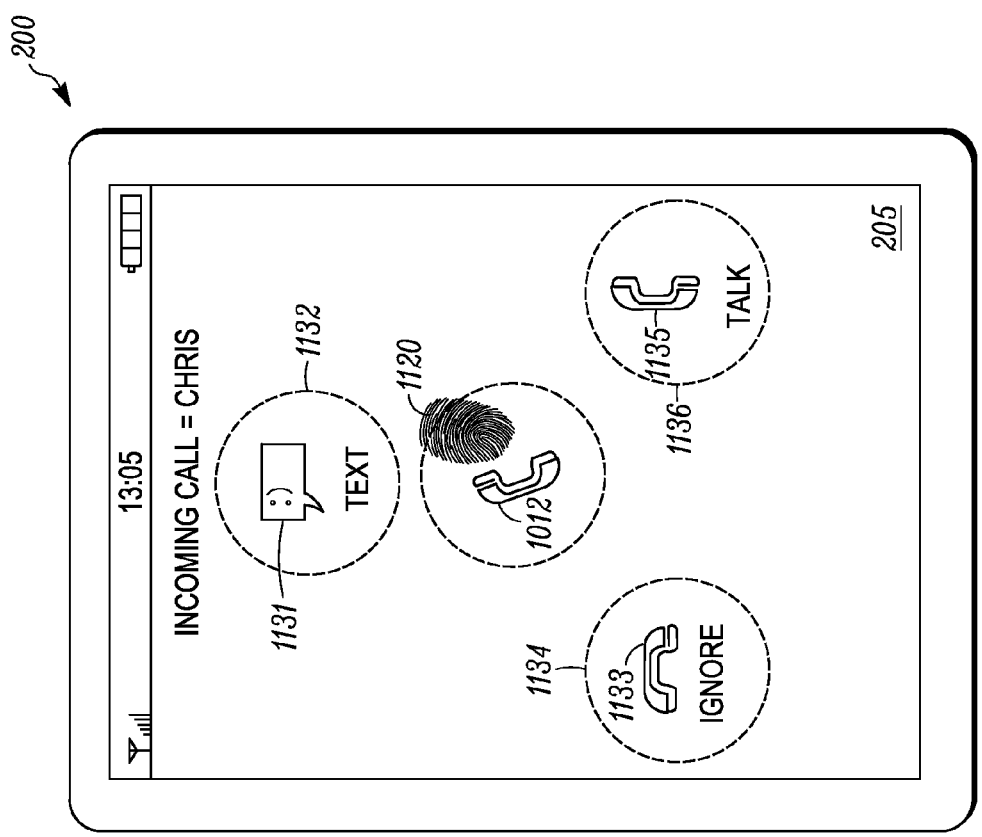
FIGS. 10-14 illustrate an example user interface sequence for transitioning an electronic device from a locked state to a telephony application and an unlocked state where a current call is ended and an incoming call is answered in accordance with some embodiments.

In the example of FIG. 11, the incoming call initial image 1012 remains displayed in the initial region 1014 of the touch screen 205 while a text incoming caller action image 1131 is also displayed in a tertiary region 1132 of the touch screen. Additionally, an ignore incoming call action image 1133 is displayed in another tertiary region 1134 of the touch screen 205. Note that, to visually aid the user in selecting either an intermediate image or an action image, the incoming call initial image 1012 may be faded, reduced, or darkened after the first touch contact 1120 is detected.

FIG. 11 shows an intermediate image 1135 that relates to answering the incoming call. The intermediate image 1135 is in a secondary region 1136. FIG. 11 also shows a text incoming caller action image 1131 in a tertiary region 1132 and an ignore incoming call action image 1133 in another tertiary region 1134. When a tertiary region is contacted by a user, a software application is launched and an action is performed. When a user contacts a tertiary region 1134, the electronic device silences the incoming call notification and may direct the incoming call from Chris to a voicemail box. When a user contacts a tertiary region 1132, the electronic device silences the incoming call notification and opens a text messaging application with a new text message addressed to the incoming caller Chris.

Figure 12:
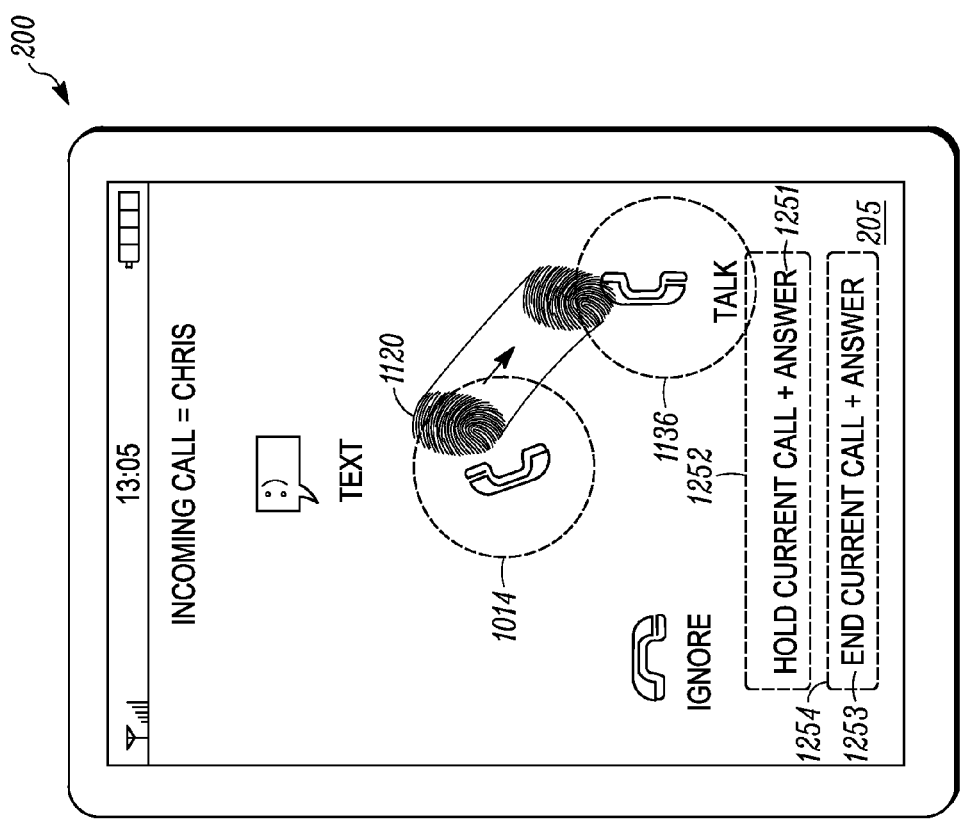

When a user contacts a secondary region 1136, the electronic device remains locked and no software application action is performed yet. In this example, the user is currently on a call when the incoming call from Chris is received. Thus, FIG. 12 shows an example of two action images 1251, 1253 that are available when secondary region 1136 is contacted by a user. In this example, a user has slid the contact from the first touch contact 1120 location to a second touch contact 1240 location. A first action image 1251 in tertiary region 1252 indicates that the user may hold the current call and answer the incoming call from Chris. A second action image 1253 in tertiary region 1254 indicates that the user may end the current call and answer the incoming call from Chris.

Figure 13:
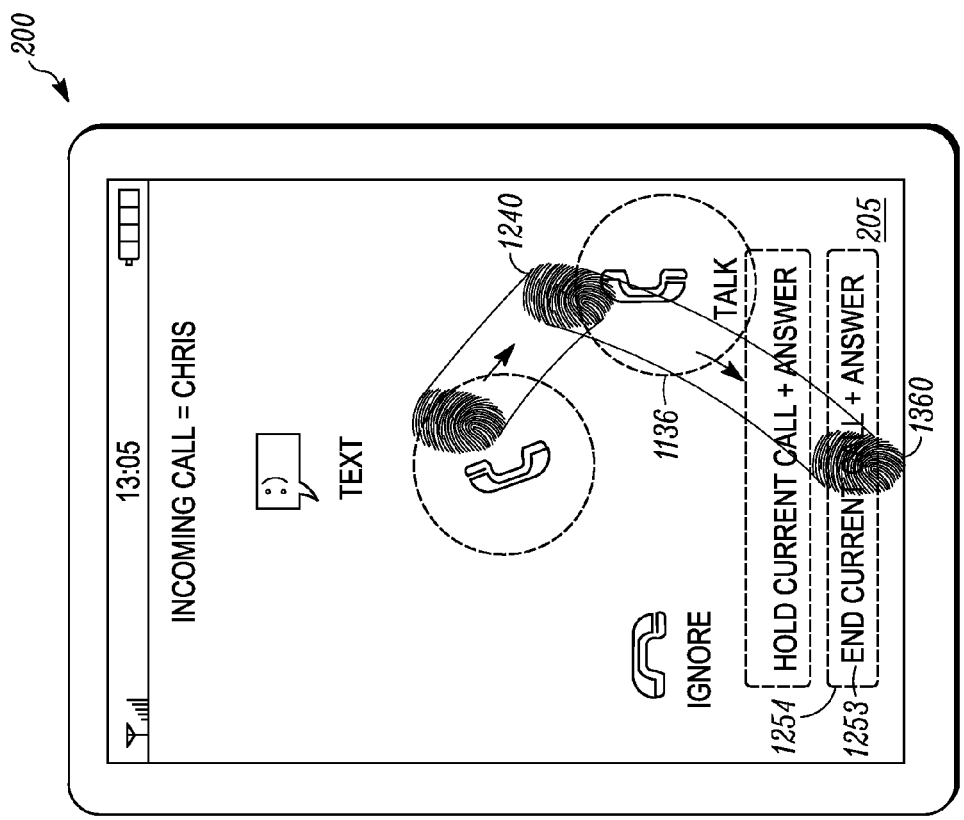
Figure 14:
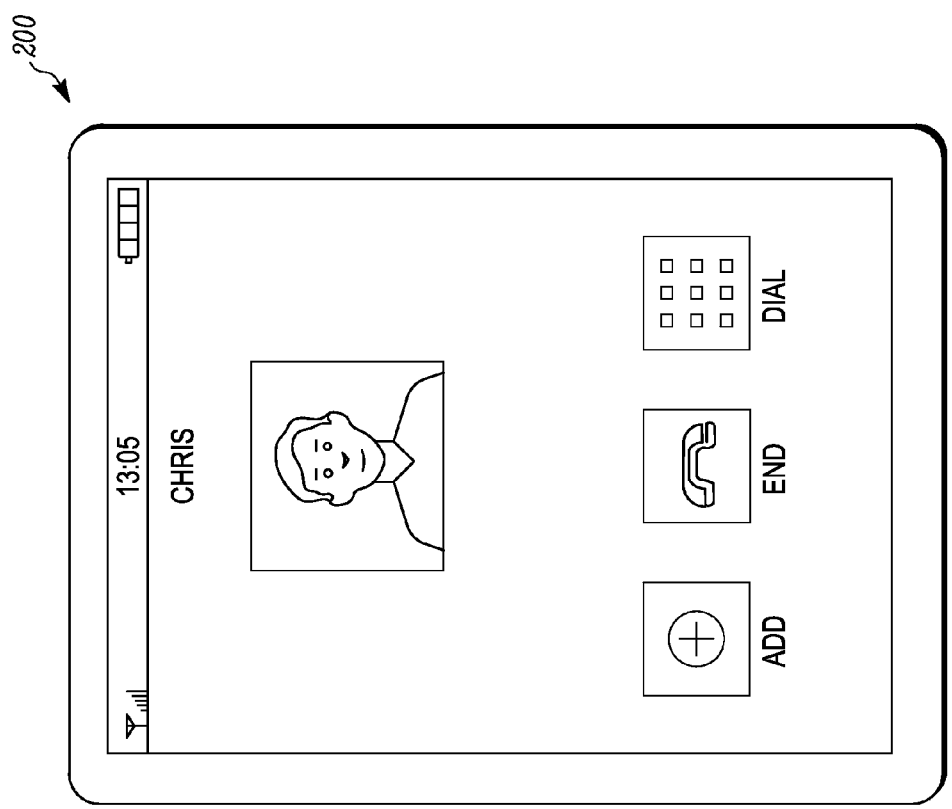

FIG. 13 shows an example of the user continuing the slide gesture from the second touch contact 1240 location to a third touch contact 1360 location. Because the third touch contact 1360 location is determined to be in the tertiary region 1254, the action associated with the action image 1253 is performed. FIG. 14 shows an example of a touch screen 205 when the current call is ended and the incoming call from Chris is answered. Meanwhile, the electronic device is in an unlocked state and the user may select any of the various options available from the touch screen 205.

OPERATION EXAMPLE 4

FIGS. 10-12 and 15-16 illustrate an example user interface sequence for transitioning an electronic device from a locked state to a telephony application and an unlocked state where a current call is held and an incoming call is answered in accordance with some embodiments. FIGS. 10-12 have been previously described with reference to Operation Example 3.

Figure 15:
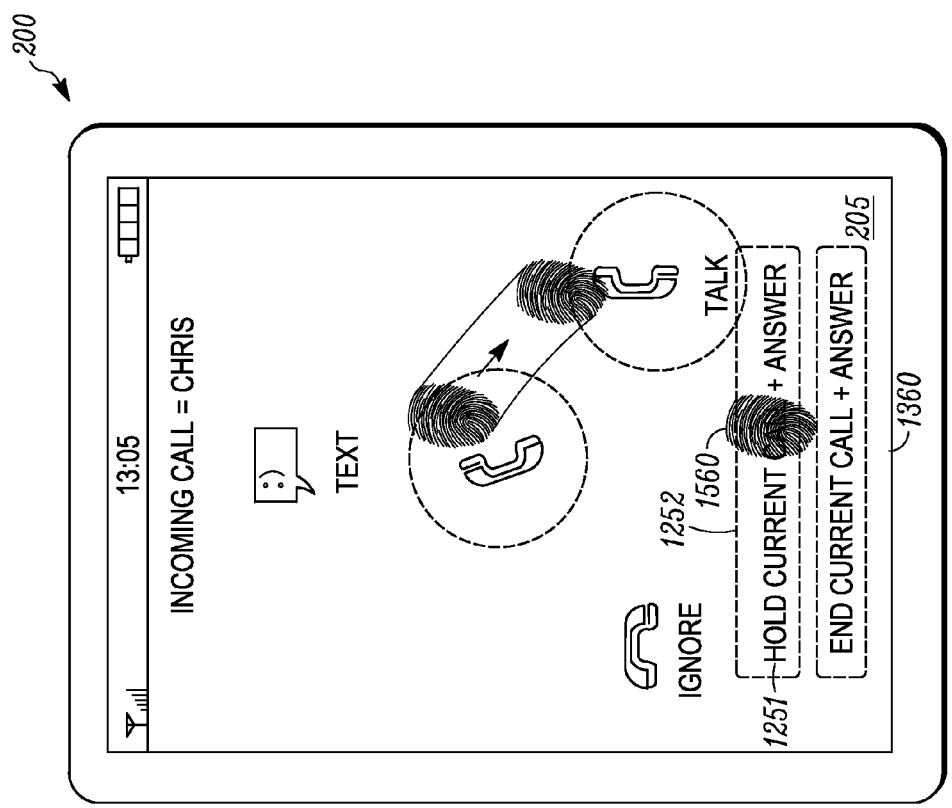
Figure 16:
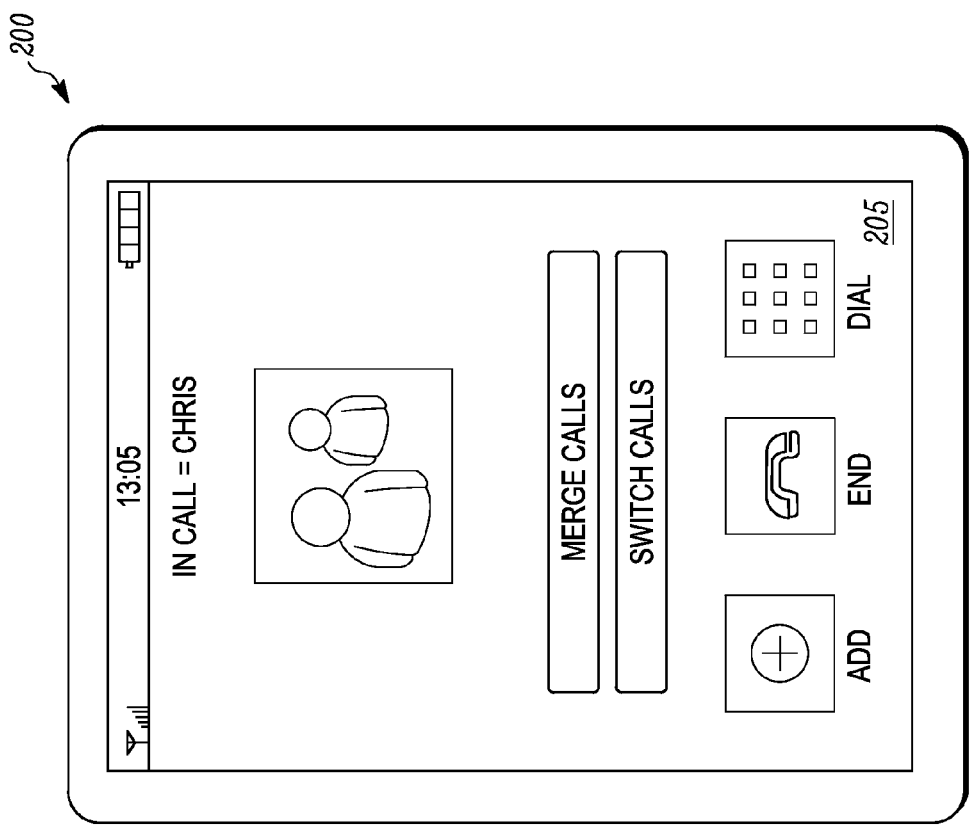

Instead of contacting the tertiary region 1254 using a slide gesture continuation, the example in FIG. 15 shows a user contacting a tertiary region 1252 using a single tap gesture. When the third touch contact 1560 is detected at tertiary region 1252, the electronic device 200 holds the current call and answers the incoming call from Chris. FIG. 16 shows that the call from Chris is answered, a previous call is on hold, and there are options to merge the two calls or switch between the calls. Meanwhile, the electronic device is in an unlocked state and the user may select any of the various options available from the touch screen 205.

Device Overview

Figure 17:
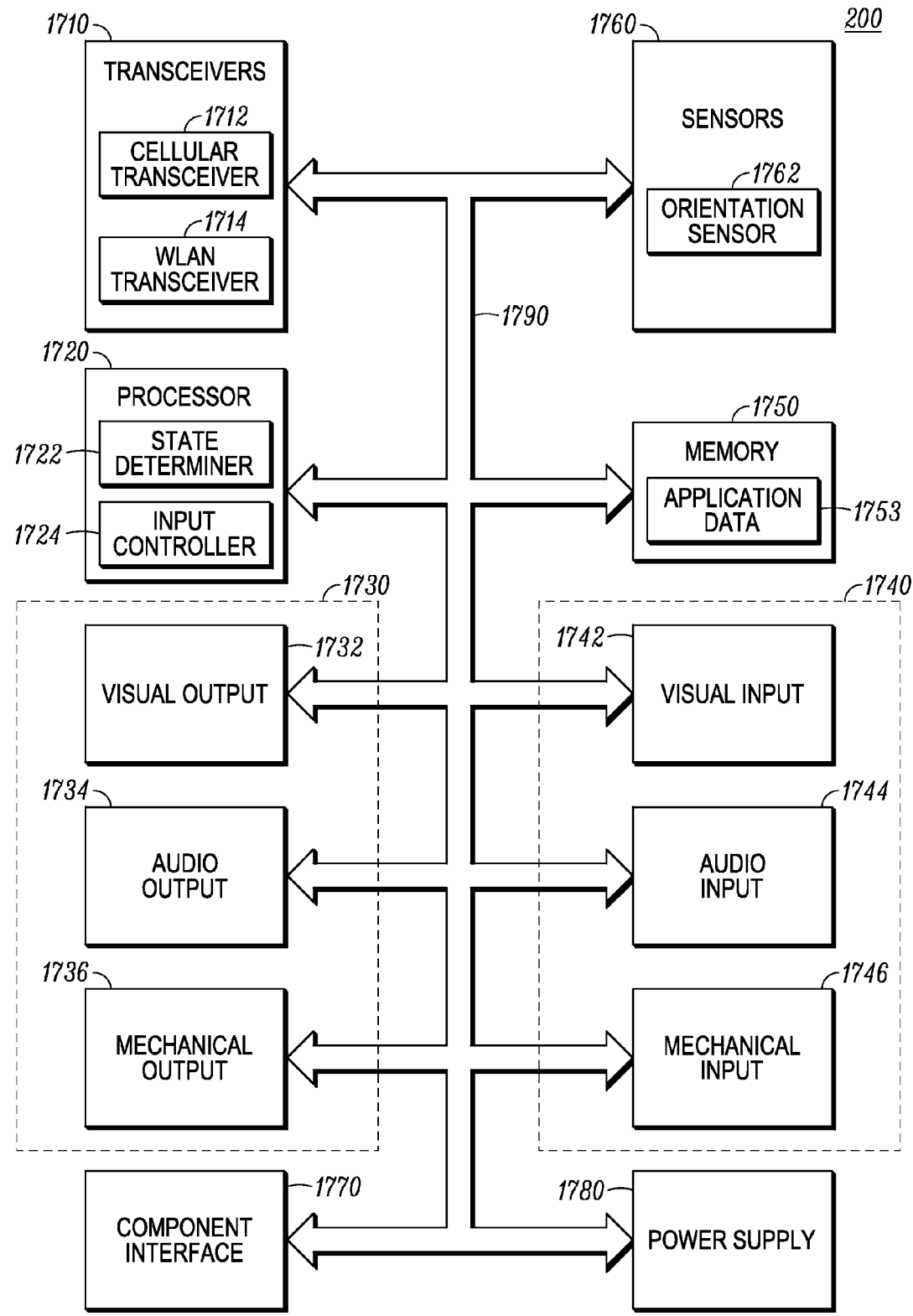
FIG. 17 is a block diagram of an example of an electronic device in accordance with some embodiments.

FIG. 17 is a block diagram of an example of an electronic device 200 in accordance with some embodiments. In the embodiments shown by FIG. 17, the electronic device 200 includes a communication unit 1710, a processor 1720, output components 1730, input components 1740, a storage component 1750, and/or one or more physical sensors 1760 that are coupled together via a bus 1790. Also shown are a component interface 1770, which may lead to peripherals or accessory devices, and a power supply component 1780. In different embodiments, the electronic device 200 may include different and/or additional components than those illustrated in FIG. 17.

The communication unit 1710 transmits data from the electronic device 200 to a network and/or to other electronic devices and receives data from the network and/or the other electronic devices. In an embodiment, the communication unit 1710 includes a cellular transceiver 1712 that transmits and/or receives data using one or more wireless wide area network communication protocols. For example, the communication unit 1710 includes one or more wireless transceivers transmitting and/or receiving data using one or more wireless communication protocols, such as Global System for Mobile (GSM), Code Division Multiple Access (CDMA), Universal Mobile Telecommunications System (UMTS), General Packet Radio Service (GPRS), High Speed Download Packet Access (HSDPA), High Speed Uplink Packet Access (HSUPA), Long-Term Evolution (LTE), or another wireless communication protocol. The communication unit 1710 also includes a WLAN transceiver 1714 compliant with IEEE 802.11 a/b/g/n (WiFi) standards. In another embodiment, the communication unit 1710 is a network adapter or other type of wired communication port for communicating with a network or with another electronic device using a wired communication protocol, such as Universal Serial Bus (USB), Ethernet, or another suitable wired communication protocol. In yet another embodiment, the communication unit 1710 has a combination of one or more transceivers and a wired network adapter, or similar wired device. Additional or alternate transceivers may include Worldwide Interoperability for Microwave Access (WiMax), near field communication (NFC), and BLUETOOTH® transceivers.

The processor 1720 processes data or instructions and may have various computing architectures. For example, the processor 1720 processes data or instructions using a complex instruction set computer (CISC) architecture, a reduced instruction set computer (RISC) architecture, an architecture implementing a combination of instruction sets or any other suitable instruction set. Although FIG. 17 shows a single processor 1720, in other embodiments the electronic device 200 may include multiple processors. The processor 1720 transmits, processes, and/or retrieves data from the storage component 1750, input components 1740, output components 1730, the communication unit 1710, and/or one or more physical sensors 1760.

Input components 1740 are configured to receive input and to communicate the received input to the processor 1720, to the storage component 1750, or to another component of the electronic device 200 via the bus 1790. Input components 1740 may include visual input components 1742 such as a still or video camera, audio input components 1744 such as a microphone, and mechanical input components 1746 such as buttons, a joystick, a mouse, a trackball, or touch panels. Output components 1730 have one or more components that convey data or information to a user of the electronic device 200. Output components 1730 may include visual output components 1732 such as a display screen or light emitting diodes, audio output components 1734 such as audio speakers, and mechanical output components 1736 such as vibrators. A touchscreen includes both a visual output component 1732 and a mechanical input component 1746.

Sensors 1760 capture data describing an environment external to the electronic device 200 and/or physical properties of the electronic device 200. One or more physical sensors 1760 are coupled to the processor 1720, storage component 1750, input components 1740, output components 1730, and/or communication unit 1710 via the bus 1790. For example, a light sensor may generating data describing an amount of ambient light. As another example, a microphone may be used to capture ambient audio data. As another example, a proximity sensor generates data describing the distance from the electronic device 200 to an object, such a user. Additional examples of physical sensors 1760 include one or more devices capturing a temperature of the electronic device 200 or of an environment including the electronic device 200, a humidity of the environment including the electronic device 200, or a pressure applied to the one or more devices. Another type of sensor could be a GPS positioning receiver. The above are merely examples of physical sensors 1760, and in various embodiments, different and/or additional types of physical sensors 1760 may be used.

In an embodiment, a physical sensor 1760 includes an orientation sensor 1762 determining an orientation associated with the electronic device 200. For example, the orientation sensor 1762 has a tilt sensor measuring tilting in two or more axes of a reference plane. In an embodiment, the orientation sensor 1762 includes an accelerometer determining an orientation of the electronic device 200. The orientation sensor 1762 may generate a first control signal responsive to determining the electronic device 200 has a first orientation and generate a second control signal responsive to determining the electronic device 200 has a second orientation. For example, the orientation sensor 1762 generates a first control signal responsive to determining the electronic device 200 has a first orientation relative to a reference plane and generates a second control signal responsive to determining the electronic device 200 has a second orientation relative to the reference plane. For example, the orientation sensor 1762 generates the first control signal responsive to being perpendicular to a reference plane and generates the second control signal responsive to being parallel to the reference plane. In an embodiment, the first orientation and the second orientation are orthogonal to each other, such as a landscape orientation and a portrait orientation.

The storage component 1750 stores data and/or instructions that, when executed by the processor 1720, causes the processor 1720 to perform one or more actions or to provide one or more types of functionality. The data and/or instructions included in the storage component 1750 may include computer-readable code that, when executed by the processor 1720, performs one or more of the methods described herein and/or provides at least a subset of the functionality described herein. The storage component 1750 may have a dynamic random access memory (DRAM), a static random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art. The storage component 1750 may be a persistent storage device, a non-persistent storage device or a combination of a persistent storage device and a non-persistent storage device, in various embodiments. The storage component 1750 communicates to the processor 1720, input components 1740, output components 1730, the communication unit 1710, and/or one or more physical sensors 1760 via the bus 1790.

In the embodiment shown by FIG. 17, the processor 1720 includes a state determiner 1722 and an input controller 1724 while the storage component 1750 includes application data 1753. The state determiner 1722 controls a state of the electronic device 200. A state of the electronic device 200 describes how the electronic device 200 responds to receipt of input or modifies a manner in which the electronic device 200 receives input. In an embodiment, the state determiner 1722 determines whether the electronic device 200 is in a locked state or is in an unlocked state. In other embodiments, the state determiner 1722 determines a state of the electronic device 200 from a set of states.

For example, the state determiner 1722 determines whether one or more locking conditions have been satisfied and places the electronic device 200 in a locked state responsive to satisfaction of one or more locking conditions. Examples of locking conditions include receipt of an input to lock the electronic device 200, lapse of a predetermined period of inactivity, or any other suitable condition. In the locked state, components of the electronic device 200 receive power but the electronic device 200 does not perform an action responsive to most input received via an input component 1740 and/or a physical sensor 1760. The state determiner 1722 may communicate with the display component 1732 to display text and/or images indicating the electronic device 200 is in a locked state. Data displayed on the display component 1732 while the electronic device 200 is in a locked state is also referred to herein as a "lockscreen."

In an embodiment, the electronic device 200 is prevented from performing a specified set of functions and/or operations responsive to a received input from the input component 1740 and/or from a physical sensor 1760. For example, the electronic device 200 does not execute one or more applications and does not transition between different displays while in a locked state. While in a locked state, the electronic device 200 only performs an action responsive to receiving an input as defined by a specified set of inputs. For example, the state determiner 1722 transitions the electronic device 200 to the unlocked state responsive to an input component 1740 receiving an input included in a set of inputs associated with unlocking the electronic device 200.

The state determiner 1722 also determines whether an unlocking condition has been met and places the electronic device 200 in an unlocked state responsive to satisfaction of an unlocking condition. For example, the state determiner 1722 unlocks the electronic device 200 only when a first touch contacts an initial region of a touch screen, a second touch contacts a secondary region of the touch screen, and a third touch contacts a tertiary region of the touchscreen. While in the unlocked state, the electronic device performs actions and/or functions in response to an input component 1740 or to a physical sensor 1760 receiving an input. For example, while in the unlocked state, the electronic device 200 executes an application responsive to an input component 1740 receiving an input.

The input controller 1724 has instructions that, when executed by the processor 1720, determines whether an input component 1740 receives an input and communicates a received input to an application or another component of the electronic device 200. For example, the input controller 1724 detects contact with an initial, secondary, or tertiary region of a touch-sensitive display and generates data identifying an application or device action corresponding to the contacted region of the touch-sensitive display. In some embodiments, the input controller 1724 also receives input from the state determiner 1722 and limits the actions performed responsive to receiving inputs. For example, while in a locked state, the input controller 1724 generates data for performing an action responsive to an input component 1740 receiving an input associated with unlocking the electronic device 200, but does not generate data for performing an action responsive to other inputs received by an input component 1740.

In an embodiment, the input controller 1724 also determines additional attributes of input received by an input component 1740. For example, the input controller 1724 determines whether a touch-sensitive display is contacted and determines motion of a contact with the touch-sensitive display. When the input controller 1724 determines motion of a contact with the touch-sensitive display, the input controller 1724 may determine speed, velocity, direction and/or acceleration of the contact with the touch-sensitive display.

The application data 1753 has instructions that, when executed by the processor 1720, provide functionality to a user of the electronic device 200 or to the electronic device 200. For example, the application data 1753 includes data for executing a web browser, allowing the electronic device 200 to receive input identifying a content provider or a server via an input component 1740, and for retrieving data from an identified content provider or server. Additional examples of application data 1753 include a text editor, a word processor, an email client, a messaging client, a calendar, an address book, a telephone dialer, an image gallery, a camera function, or any other suitable type of functionality.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "ha . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. In some embodiments, a combination of the two approaches may be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions, programs and/or integrated circuits with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for unlocking an electronic device comprising:
    on a touch screen of the electronic device, displaying a lockscreen with an initial image in an initial region;
    detecting a first touch contact in the initial region;
    responsive to the detecting the first touch contact, displaying an intermediate image in a first secondary region of the touch screen;
    detecting a second touch contact in the first secondary region;
    responsive to the detecting the second touch contact, displaying an action image in a first tertiary region of the touch screen;
    detecting a third touch contact in the first tertiary region;
    responsive to the detecting the third touch contact, executing an action associated with the action image and unlocking the electronic device.

2. The method of claim 1, wherein the first touch contact and the second touch contact are part of a single slide gesture.

3. The method of claim 1, wherein the second touch contact and the third touch contact are part of a single slide gesture.

4. The method of claim 1, wherein the first touch contact, the second touch contact, and the third touch contact are part of a single slide gesture.

5. The method of claim 1, wherein the first touch contact is a tap gesture.

6. The method of claim 1 wherein the initial region is larger than the initial image.

7. The method of claim 1 wherein the first secondary region is larger than the intermediate image.

8. The method of claim 1 wherein the first tertiary region is larger than the action image.

9. The method of claim 1 further comprising:
    responsive to the detecting the first touch contact, displaying a second intermediate image in a second secondary region of the touch screen.

10. The method of claim 9 wherein the first secondary region and the second secondary region do not overlap.

11. The method of claim 9 wherein the first secondary region and the second secondary region overlap.

12. The method of claim 1 further comprising:
    responsive to the detecting the second touch contact, displaying a second action image in a second tertiary region of the touch screen.

13. The method of claim 12 wherein the first tertiary region and the second tertiary region do not overlap.

14. The method of claim 12 wherein the first tertiary region and the second tertiary region overlap.

15. The method of claim 1 wherein the first tertiary region overlaps with the initial region.

16. The method of claim 1 wherein the first tertiary region overlaps with the first secondary region.

17. The method of claim 1, further comprising:
    responsive to the detecting the first touch contact, visually modifying the initial image.

18. The method of claim 1, further comprising:
    responsive to the detecting the second touch contact, visually modifying the intermediate image.

19. The method of claim 1 wherein the intermediate image refers to messaging.

20. The method of claim 19 wherein the action image refers to a messaging application.

21. The method of claim 1 wherein the intermediate image refers to telephony.

22. The method of claim 21 wherein the action image refers to answering an incoming call.

23. An electronic device comprising:
    a touch-sensitive display;
    a processor coupled to the touch-sensitive display; and
    a storage device coupled to the processor, the storage device including instructions that, when executed by the processor, cause the processor to:
        detect a first contact with the touch-sensitive display at an initial region associated with an unlock image;
        responsive to detecting the first contact, display an intermediate image in a secondary region of the touch-sensitive display;
        detect a second contact with the touch-sensitive display at the secondary region;
        responsive to detecting the second contact, display an action image in a tertiary region of the touch-sensitive display;
        detect a third contact with the touch-sensitive display at the tertiary region; and
        responsive to detecting the third contact, execute an action associated with the action image, wherein execute the action associated with the action image comprises: transition the electronic device from a locked state to an unlocked state.

* * * * *